United States Patent
Wallrabenstein et al.

[11] 3,718,625
[45] Feb. 27, 1973

[54] PRODUCTION OF A POLYACYLOXALAMIDRAZONE

[75] Inventors: Michael Wallrabenstein, Worth; Albert Schopf, Hering; Dieter Frank, Elsenfeld, all of Germany

[73] Assignee: Glanzstoff AG, Wuppertal, Germany

[22] Filed: Oct. 5, 1970

[21] Appl. No.: 78,301

[52] U.S. Cl. .....260/78 TF, 260/29.2 N, 260/33.6 R, 260/33.8 R
[51] Int. Cl. .........................C08g 20/20, C08g 20/22
[58] Field of Search ..................................260/78 TF

[56] References Cited

UNITED STATES PATENTS

| | | | |
|---|---|---|---|
| 3,583,953 | 6/1971 | Rupp et al. | 260/78 X |
| 3,544,528 | 12/1970 | Magerlein et al. | 260/78 |
| 3,560,453 | 2/1971 | Schopf et al. | 260/78 |

OTHER PUBLICATIONS

Polymer Letters, Vol. 4, pp. 869–873, (1966), Saga et al.
Chem. Abstracts, Vol. 67, 1967, 117411j, Saga et al.

Primary Examiner—Howard E. Schain
Attorney—Johnston, Root, O'Keeffe, Keil, Thompson and Shurtluff

[57] ABSTRACT

Production of polyacyloxalamidrazones, especially a very high molecular weight polyterephthaloyloxalamidrazone having recurring units of the formula

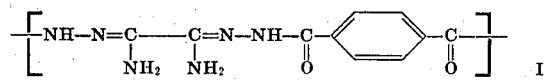

by an interfacial polycondensation of oxalic acid bisamidrazone with an acyl dihalide monomer such as terephthalic acid dichloride at temperatures of 0°C. to 60°C. in a two-phase solvent system consisting essentially of water and a water-immiscible, inert organic solvent, in the presence of an acid acceptor and in the presence of a substantial amount of a neutral alkali metal salt. High molecular weight polymer films or filaments can be formed from an alkaline solution of the polymer.

11 Claims, No Drawings

PRODUCTION OF A POLYACYLOXALAMIDRAZONE

It has been previously disclosed that polyacyloxalamidrazones can be produced by the reaction of oxalic acid bisamidrazone with a dicarboxylic acid dihalide in either a single acceptor and with mixing at temperatures between about 0° and 150°C. Depending upon the solvents chosen for the polycondensation reaction and certain other conditions, it is possible to achieve some variation in the molecular weight of the resulting polycondensate. A two-phase solvent system is generally preferred in achieving higher molecular weight products, by means of a so-called interfacial polycondensation. Although it is feasible to employ water and a water-immiscible organic liquid in forming the two phases, better results were achieved with special organic solvents which are at least partially water-miscible. For example, it is possible to employ a two-phase solvent system using water as one phase and a water-miscible organic liquid as the other phase, this organic liquid being inert to the dicarboxylic acid halide and having its miscibility with water substantially or completely suppressed by the addition of a salting-out agent. A suitable two-phase reaction medium of this type consists of water and tetrahydrofuran wherein a phase separation is achieved by the addition of soda as a salting-out agent. Also, since sodium carbonate is a basic substance, it is capable of simultaneously acting as an acid acceptor.

In these earliest developed processes for the production of polyacyloxalamidrazones, it was possible to achieve only relatively low molecular weight polycondensates as established by viscosity measurements. For example, depending upon the type of initial monomers and the solvent system being employed, the reduced viscosity of the polycondensate did not exceed a value of 0.5 to 2.5, measured as a solution of 1 gram of the polymer in 100 ml of a 10 percent aqueous potassium hydroxide solution at 20°C.

In a further development of this polycondensation process, it has been possible to achieve somewhat higher molecular weight polymers by the reaction of oxalic acid bisamidrazone with a dicarboxylic acid dihalide at temperatures between about 0° and 60°C. in a two-phase solvent mixture consisting essentially of water and a very pure tetrahydrofuran in a volume ratio of 3:1 to 1:3, preferably employing as the salting-out agent about 3 to 15 percent by weight of sodium chloride or sodium sulfate (with reference to the amount of water). Also, alkali metal carbonates or bicarbonates are preferred as the acid acceptor. When following this special procedure, it has been possible to obtain polyacyloxalamidrazones with a reduced viscosity of from 3.3 to 5.4, again depending upon the initial monomers. The reduced viscosity in this case is also measured as noted above, and this particular measurement is employed throughout this specification.

Thus, the best results in the production of polyacyloxalamidrazones has been achieved in accordance with the earlier application of Magerlein et al, Ser. No. 716,364, filed Mar. 27, 1968 now U.S. Pat. No. 3,544,528. Since this earlier application sets forth the general polycondensation reaction in considerable detail, it is incorporated herein by reference as fully as if set forth in its entirety. For the production of much lower molecular weight polycondensates, attention is further directed to the earlier work of Saga et al, Kogyo Kagaku Zasshi, 69, page 2225 (1966); also, compare Polymer Letters, page 869 (1966).

It is a primary object of the present invention to provide a process which leads to a polyterephthaloyloxalamidrazone having a substantially higher molecular weight than any previous polymer of this type, i.e. as evidenced by a considerably higher viscosity when measured under identical conditions in a 10 percent aqueous potassium hydroxide solution. Other objects and advantages of the invention will become more apparent upon consideration of the following detailed specification.

It has now been found, in accordance with the invention, that a polyterephthaloyloxalamidrazone of substantially higher viscosity can be obtained in the reaction of oxalic acid bisamidrazone and terephthalic acid dichloride at temperatures between about 0° and 60°C., using a two-phase solvent mixture of water and a water-immiscible, inert organic solvent, provided that the polycondensation reaction is carried out in this solvent mixture in the presence of a neutral alkali metal salt having a concentration in the aqueous phase of 10 percent by weight up to its saturation concentration in this aqueous phase.

Suitable organic solvents for the water-immiscible phase generally includes aliphatic and aromatic hydrocarbons and their chlorinated derivatives, such hydrocarbons being essentially inert with reference to the monomeric reactants. Of course, this organic solvent must remain in liquid form under the reaction conditions so that one will normally select a hydrocarbon solvent having a boiling point substantially above 60°C. Also, one will normally select a hydrocarbon which is a good solvent for the acyl dihalide, e.g. terephthalic acid dichloride. Especially preferred solvents are hexane, carbon tetrachloride, benzine, petroleum ether, toluene and xylene.

Suitable neutral alkali metal salts include the halides, sulfates and nitrates of the metals sodium, potassium and lithium. It is especially preferred to use at least one of the following salts: lithium sulfate, lithium chloride, sodium chloride, sodium sulfate, potassium chloride and potassium sulfate.

Any suitable acid acceptor may be employed in conventional amounts sufficient to take up the acid split off during the polycondensation reaction. The acid acceptor is preferably a basic-reacting inorganic salt which is soluble in water as one of the liquid phases of the reaction medium, but in principle it is possible to use any organic or inorganic basic-reacting compound, including alkali metal hydroxides, carbonates or bicarbonates, or even pyridine or triethylamine as organic bases. Especially good results have been achieved when using sodium bicarbonate as the acid acceptor.

It is feasible to initially add the acid acceptor to either the aqueous phase or the organic solvent phase, but it is preferable to employ water-soluble inorganic basic reacting compounds which are then preferably added to the aqueous phase. Again, the best results are generally obtained by employing a sodium or potassium carbonate or bicarbonate, especially sodium bicarbonate.

The initial concentration of the oxalic acid bisamidrazone appears to have some effect upon the molecular weight of the polycondensate product, and for this reason it is preferable to employ this monomer in a concentration of about 6.6 to 60 millimols, preferably 6.6 to 40 millimols, per liter of water. Especially good results have been achieved when the oxalic acid bisamidrazone is supplied to the reaction mixture in the aqueous phase at a concentration of about 10 to 25 millimols per liter of water.

The volume ratio of water:organic solvent may vary widely, although it is conventional to employ about equal parts by volume of water and the organic solvent for the two-phase reaction mixture. For most purposes, this volume ratio will thus be maintained between about 3:1 to 1:3, preferably 2:1 to 1:2. It is also preferable to carry out the polycondensation at a reaction temperature of about 10° to 40°C., these temperatures being maintained in a conventional manner by removing the heat of reaction. It is not essential to maintain a constant temperature throughout the reaction, and it will be generally understood that the recited temperature conditions refer to the temperature peak which occurs at the beginning of the reaction. As a matter of convenience, the reaction can be carried out at about room temperature or at slightly elevated temperatures which do not exceed 60°C.

In carrying out the reaction, the various materials are brought together in the usual manner, but preferably by first dissolving the oxalic acid bisamidrazone in water together with the neutral alkali metal salt and the acid acceptor which is preferably a water-soluble inorganic basic-reacting compound. When using a neutral lithium salt, it is preferable to separately dissolve the oxalic acid bisamidrazone with the preferred acid acceptor in one portion of water while separately dissolving a preferred acid acceptor such as sodium bicarbonate in another portion of water, thereafter bringing both aqueous portions together at about room temperature. In all cases, it is preferable to employ a substantially oxygen-free distilled water. The terephthalic acid dichloride is dissolved in the organic solvent and then added together with this organic solvent under strong mixing conditions to the water containing all of the other reaction components. At the same time, the reaction mixture is cooled sufficiently by any conventional means, e.g. by indirect heat exchange with any suitable cooling fluid, so as to withdraw the heat of reaction and maintain the temperature within the desired limits. After completion of the reaction, the polycondensate product can be separated or isolated from the two-phase solvent medium by conventional filtration or centrifuging, preferably followed by washing with water and alcohol and then purifying the product by distillation or by careful drying in a vacuum.

When the process is carried out in accordance with the present invention, it is possible to obtain a polyterephthaloyloxalamidrazone with a reduced viscosity as high as 12 (measured as a solution of 1 gram of the polymer in 100 ml of a 10 percent by weight aqueous solution of potassium hydroxide at 20°C.). It is thus possible to obtain essentially new and higher molecular weight polycondensates with values for the above defined reduced viscosity of about 6 to 12 and preferably more than 7 up to about 12. These high molecular weight polycondensates can be dissolved in a dilute aqueous alkali metal hydroxide solution and then spun or formed in an acid bath in a conventional manner to produce filaments, films, foils or the like.

The invention is further illustrated by the following examples:

Example 1

A solution of 4.35 grams (37.5 millimols) of oxalic acid bisamidrazone, 6.3 grams (75 millimols) of sodium bicarbonate and 113 grams (1.96 mols) of sodium chloride in 750 ml. of oxygen-free distilled water is placed in a mixing vessel equipped with a high-speed stirrer. A solution of 7.61 grams (37.5 millimols) of terephthalic acid dichloride in 750 ml. of dry toluene is added to the mixing vessel with rapid stirring and cooling with water to remove the heat of reaction. After about 25 minutes, the reaction is completed. The resulting polycondensate is filtered off, substantially freed of the liquid solvent mixture, washed several times with water and finally dried in a vacuum at 60°C. The product has a reduced viscosity of 5.94, measured as a solution of 1 gram of the polycondensate in 100 ml. of a 10 percent KOH aqueous solution at 20°C.

Example 2

A solution of 112.4 grams (2.65 mols) of lithium chloride and 4.35 grams (37.5 millimols) of oxalic acid bisamidrazone in 500 ml. of oxygen-free distilled water and a solution of 6.3 grams (75 millimols) of sodium bicarbonate in 250 ml. of oxygen-free distilled water are brought to room temperature, combined with each other and placed in the mixing vessel of a Kotthoff mixer. With rapid stirring at about $2.8 \times 10^3$ r.p.m. and cooling with water, a solution of 7.61 grams (37.5 millimols) of terephthalic acid dichloride in 750 ml. of dry hexane is added into the mixing vessel. The reaction mixture is stirred for about 25 minutes to complete the polycondensation. Then, the resulting polycondensate is centrifuged off, washed with water and alcohol and finally dried in a vacuum at 60°C. The polycondensate product has a reduced viscosity of 6.95, measured as in Example 1.

Examples 3–10

In each of these examples, the same procedure is followed as in the preceding examples but with variations in the equimolar amount of each of the monomers, i.e. oxalic acid bisamidrazone and terephthalic acid dichloride, as shown in column 2 of the table below. Also, different organic solvents are employed as set forth in column 3 of the table while adding an alkali metal salt in the amount shown in column 4 of the table. In each instance, the designated amounts of oxalic acid bisamidrazone and alkali metal salt together with the appropriate equivalent amount of sodium bicarbonate (i.e. twice the molar amount given in column 2 of the table) as the acid acceptor are dissolved in 750 ml. of oxygen-free distilled water and placed in the mixing vessel which is equipped with a high-speed stirrer. Then, the equivalent amount of terephthalic acid dichloride (i.e. once the molar amount given in column 2 of the table) dissolved in 750 ml. of the particular organic solvent of the table is added, and the reaction proceeds as in Example 1 to produce and recover the final polycondensation product. The reduced viscosity of each product is given in column 5 of the table, measured as in Example 1.

TABLE

| Example | Amount of Each Monomer (millimols) | Organic Solvent | Alkali Metal Salt—Amount | viscosity |
|---|---|---|---|---|
| 3 | 25 | Benzine | NaCl 266.25 g | 6.2 |
| 4 | 10 | Hexane | NaCl 266.25 g | 11.84 |
| 5 | 25 | Toluene | NaCl 266.25 g | 6.75 |
| 6 | 10 | Toluene | NaCl 266.25 g | 11.95 |
| 7 | 37.5 | Carbon Tetrachloride | KCl 150 g | 7.2 |
| 8 | 37.5 | " | $Na_2SO_4$ 75 g | 5.9 |
| 9 | 37.5 | " | $Li_2SO_4$ 112.5 g | 6.0 |
| 10 | 10 | " | NaCl 226.25 g | 10.7 |

Similar results can be achieved by using terephthalic acid dibromide in place of the dichloride, and for purposes of the present invention, these two halides are considered to be equivalent.

Although Saga et al, supra, have disclosed a reaction of oxalic acid bisamidrazone and terephthaloyl chloride in dimethylformamide containing 5 percent by weight of lithium chloride, this solution polycondensation in a single solvent phase permits the production of only very low molecular weight polycondensates. For example, if one reacts oxalic acid bisamidrazone with terephthalic acid dichloride in dimethylacetamide as taught by this reference, or in dimethylacetamide, N-methylpyrrolidine or hexamethylphosphoric acid triamide, in the presence of 5 percent lithium chloride, the resulting polyterephthaloyloxalamidrazone has an inherent viscosity of only 0.20 to 0.76. As will be apparent from experiments by these authors, the addition of lithium chloride, for example to hexamethylphosphoric acid triamide, fails to show any viscosity increasing effect. In fact, a comparative experiment carried out without the addition of lithium chloride actually gave a product with somewhat higher viscosity (note Table 1, Experiments 5 and 6 of Saga et al). Under these circumstances, it was quite surprising and unforeseeable that the addition of neutral alkali metal salts would exhibit a substantial viscosity increasing effect when employed in an interfacial polycondensation as required by the present invention.

By comparison to previously known processes, the process of the present invention permits the production of very high molecular weight polyterephthaloyloxalamidrazones. Moreover, these results are achieved under interfacial polycondensation conditions using a very simple two-phase mixture consisting essentially of water and a water-immiscible organic solvent. Such a two-phase system permits the use of very cheap organic solvents. Furthermore, these water-immiscible organic solvents, in comparison to tetrahydrofuran or the like, are considerably less sensitive to air or oxygen entering into the reaction system. Thus, the present invention not only provides very desirable high molecular weight polycondensates but also provides an extremely convenient method of carrying out the polycondensation reaction.

The invention is hereby claimed as follows:

1. In a process for the production of polyterephthaloyloxalamidrazone by reaction of oxalic acid bisamidrazone with terephthalic acid dichloride in a two phase solvent system of water and a water-immiscible, inert organic solvent and in the presence of an acid acceptor while mixing and withdrawing the heat of reaction, the improvement which comprises carrying out said reaction at a temperature of about 0° to 60°C. and in the presence of a neutral alkali metal salt having a concentration in the aqueous phase of 10 percent by weight up to its saturation concentration in said aqueous phase.

2. A process as claimed in claim 1 wherein the oxalic acid bisamidrazone is supplied to the reaction mixture at a concentration of 6.6 to 60 millimols per liter of water.

3. A process as claimed in claim 1 wherein said organic solvent is selected from the group consisting of hexane, carbon tetrachloride, benzine, petroleum ether, toluene and xylene.

4. A process as claimed in claim 1 wherein said alkali metal salt is selected from the group consisting of lithium, sodium and potassium chlorides and sulfates.

5. A process as claimed in claim 1 wherein the oxalic acid bisamidrazone is supplied to the reaction mixture at a concentration of about 6.6 to 40 millimols per liter of water.

6. A process as claimed in claim 5 wherein said alkali metal salt is selected from the group consisting of lithium, sodium and potassium chlorides and sulfates.

7. A process as claimed in claim 6 wherein said organic solvent is hexane.

8. A process as claimed in claim 6 wherein said organic solvent is carbon tetrachloride.

9. A process as claimed in claim 6 wherein said organic solvent is selected from the group consisting of benzine and petroleum ether.

10. A process as claimed in claim 6 wherein said organic solvent is selected from the group consisting of toluene and xylene.

11. A process as claimed in claim 1 wherein the oxalic acid bisamidrazone is supplied to the reaction mixture at a concentration of about 10 to 25 millimols per liter of water.

* * * * *